United States Patent

[11] 3,604,773

[72] Inventors John M. Haynes
139-44 87th Rd., Jamaica, N.Y. 11435;
George E. Moritz, 459 Haworth Avenue,
Haworth, N.J. 07641
[21] Appl. No. 869,767
[22] Filed Oct. 27, 1969
[45] Patented Sept. 14, 1971

[54] FISHING LURE CONTAINER
7 Claims, 8 Drawing Figs.

[52] U.S. Cl. ..................................................... 312/244
[51] Int. Cl. ...................................................... A47b 95/02
[50] Field of Search ........................................... 312/120,
123, 244, 111; 190/16; 206/45 T

[56] References Cited
UNITED STATES PATENTS
1,005,568 10/1911 McKnight ..................... 190/16
3,301,619 1/1967 Mead ........................... 312/244 X
3,330,608 7/1967 Druger ......................... 312/244

Primary Examiner—Paul R. Gilliam
Attorney—Bauer and Goodman

ABSTRACT: A container comprising a first housing member and a second housing member which together form a pair of opposed exterior housing members cooperating to define an internal storage compartment pivotally mounted to each other for opening and closing movement about a pivot axis oriented transversely of and enclosed within one corner of said storage compartment, and L-shaped internal members, each of said L-shaped internal members having one end of one of the L-shaped members attached directly to and pivotally mounted on said pivot axis, whereby said L-shaped internal members are adapted to be successively pivoted through said opening movement preparatory to successive use of each, and whereby the legs that are directly attached to said pivot are in stacked side-by-side relationship when said container is closed and also when said container is open and all of said L-shaped members have been pivoted.

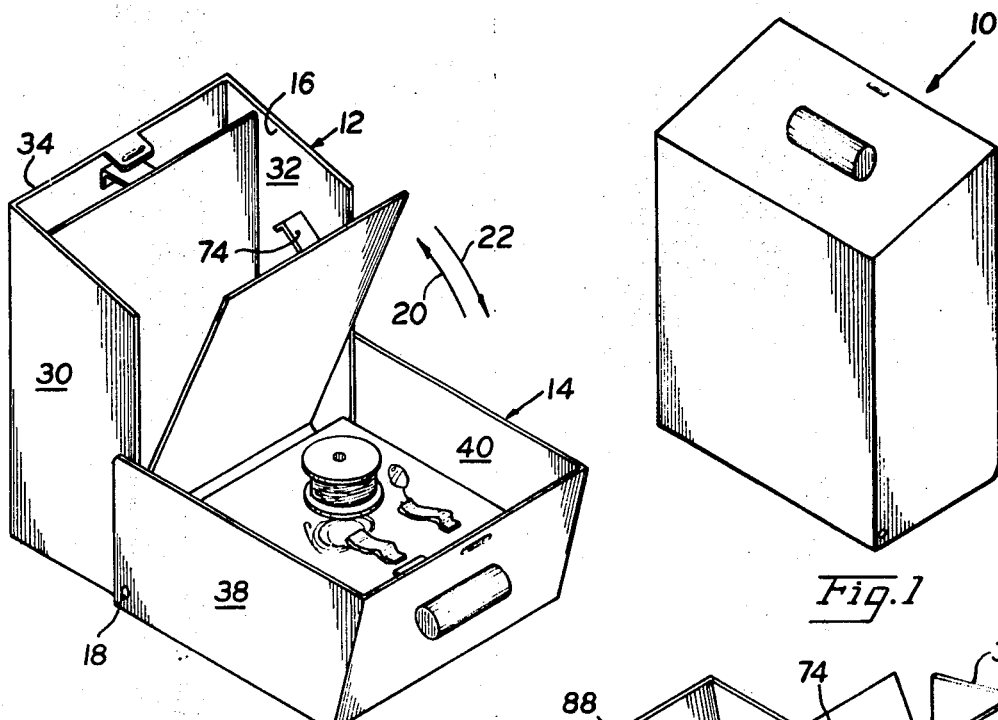
Fig.1
Fig.2
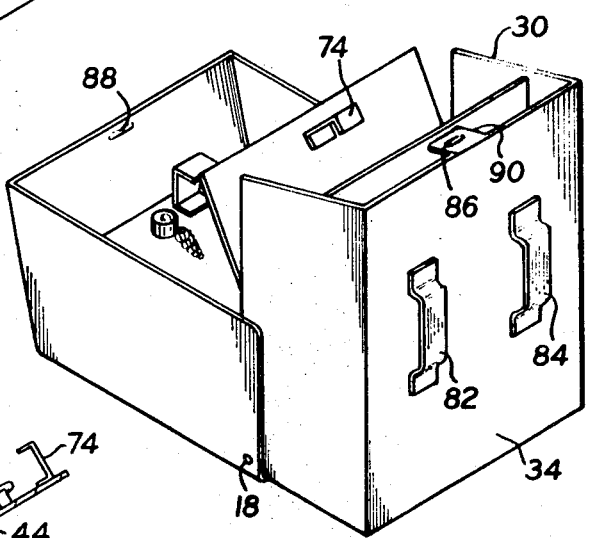
Fig.3
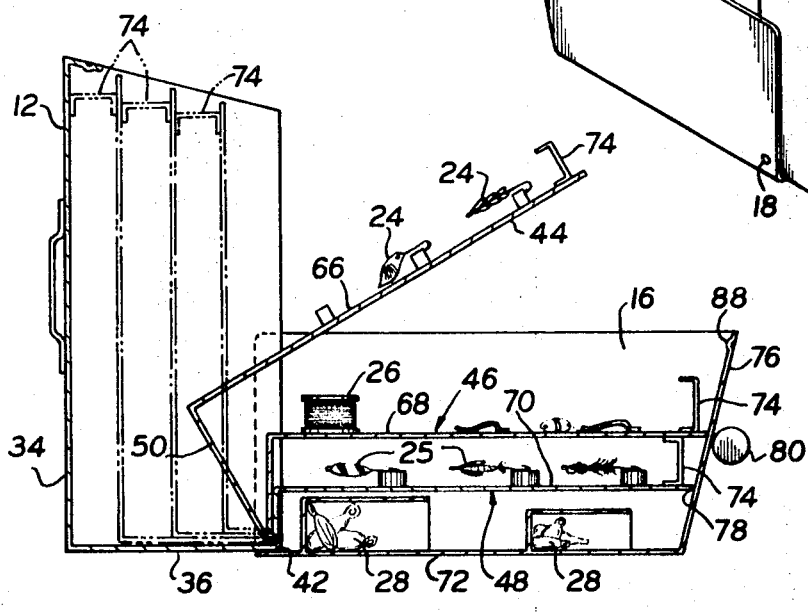
Fig.4
INVENTORS
JOHN M. HAYNES
GEORGE E. MORITZ
ATTORNEY

INVENTORS
JOHN M. HAYNES
GEORGE E. MORITZ

FISHING LURE CONTAINER

The present invention relates generally to a container for fishing lure and like paraphernalia, and more particularly to a container of compact size with, however, a noteworthy extensive storage capacity.

There is a need for a storage container, particularly for fishing lure and like paraphernalia, which has the capacity to accommodate all of the numerous items a fisherman requires at hand such as lures, hooks, reels, sinkers, to mention the main ones. To merely provide a compartmentalized box to accommodate these numerous items is not a satisfactory solution since the size of the resulting box would be cumbersome to store or transport. At the other extreme, to merely stack individual containers in a reasonably sized box is also not a satisfactory solution since the user is then burdened with continually emptying and loading the box when searching for a specific item or container. All presently known fishing lure containers are not satisfactory when considered from these extreme design viewpoints in that when the design stresses one objective it is at the expense of the other objective.

Broadly, it is an object of the present invention to provide an improved fishing lure container overcoming the foregoing and other shortcomings of the prior art. Specifically, it is an object to provide a fishing lure container which, although of nominal size, nevertheless has sufficient storage capacity for all of he numerous items of fishing paraphernalia commonly required by a fisherman, its storage areas moreover being rendered readily accessible during use of the container hereof.

A container for fishing lure and like paraphernalia demonstrating objects and advantages of the present invention includes a pair of pivotally mounted exterior housing members which define an internal storage compartment and which further includes, within this compartment, a plurality of internal storage members. All of the storage members are pivotally mounted on the same pivot that is provided for the exterior housing members. As a consequence of this pivotal arrangement and also the construction of the parts, by successively pivoting each of the parts through a pivotal movement the next successive or succeeding member is rendered accessible to the user so that the paraphernalia mounted on these members can easily be put to use. Further, since all parts of the container are integrated as a whole by virtue of the common pivot, not only is the loading and unloading of the paraphernalia from the storage members facilitated, but the possibility of the parts of the container being lost or otherwise placed out of the control of the user is, of course, minimized for all practical purposes.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of a fishing lure container exemplary of the present invention illustrating the two exterior housing members thereof in a closed position;

FIG. 2 is a similarly a perspective view of the container but illustrating the housing members in an open position and also one of the internal members thereof in a position of movement following a partial pivotal traverse;

FIG. 3 is still another perspective view, similar to FIG. 2 but as viewed from the opposite direction, and illustrating further structural features;

FIG. 4 is a side elevational view of the container, in longitudinal cross section, illustrating internal structural features thereof;

Figure 5:
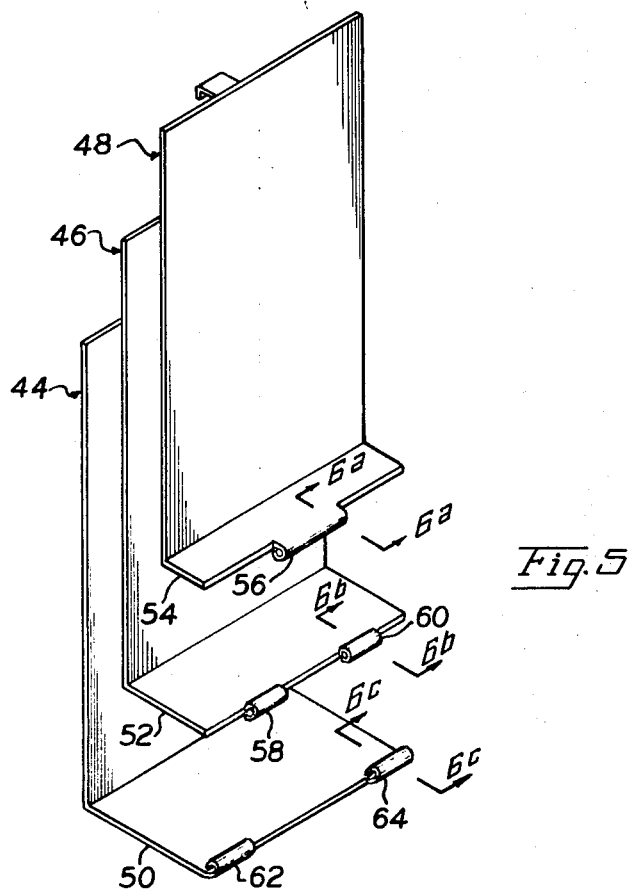
FIG. 5 is an isolated perspective view of the internal members of the container in which it is more clearly illustrated how these members are mounted on a common pivot.

Reference is now made to the drawings wherein there is shown a container, generally designated 10, which is particularly suitable for storing fishing lure and like paraphernalia. Container 10 includes a pair of external housing members 12 and 14 which cooperate to define an internal storage volume or compartment, generally designated 16, of a substantially rectangular shape. The housing members 12 and 14 are pivotally connected to each other along a transversely oriented pivot axis located in a corner of the storage compartment 16, as at 18, and consequently partake of opening and closing movements 22 and 20, respectively, about the pivot axis 18. Although container 10 obviously can be utilized for storage of many different items, not necessarily limited to fishing lure, it will be described herein as a container for fishing lure since this end use serves to emphasize the noteworthy capacity of the container 10 for storing numerous items despite its small size. For example, as a convenient container for fishing equipment, it can be utilized, as illustrated herein, for the storage of numerous items, including but not necessarily limited to the illustrated different types of fishing lures 24 and 25 (shown stored in separate compartments to distinguish between these lures), fishing rod spool 26, and a supply of sinkers 28. The manner in which this extensive storage capacity is achieved with a container 10 of nominal size, shape and extent as illustrated will now be described in detail.

The housing member 12 has opposite sidewalls 30 and 32 and, more importantly, an L-shaped configuration formed by back and bottom walls 34 and 36, respectively. That is, the sidewalls 30 and 32 can be dispensed with if the member 14 has sidewalls 38 and 40 and member 12, with its walls 34 and 36, will nevertheless cooperate with housing 14 to provide the fully enclosed storage compartment 16. This is not the only significance of the L-shaped walls 34 and 36. As may be readily appreciated from a comparison of FIGS. 2 and 4, at the opposite corners of the lower edge 42 of the bottom wall 36, the opposite ends of the pivot axis 18 are projected through portions of the side walls 30 and 32 adjacent the edge 42 to thus pivotally mount housing member 14 for the already noted pivotal movements 22 and 20. The opposite ends of the pivot 18, as clearly illustrated in FIG. 2, also extend through coextensive portions of the sidewalls 38 and 40 of the housing member 14.

In accordance with the present invention, the L-shaped construction of walls 34 and 36 of the housing member 12 are then duplicated in a number of internal storage members, in this instance being three in number, and are designated 44, 46 and 48, respectively. Each of these embers is L-shaped in cross section which, as already noted, duplicates the shape of the walls 34 and 36 except that, as related to these walls and to each other, the members are of progressively diminishing size and extent. Specifically, this diminishment in size is manifested most dramatically in the height of the comparatively shorter leg of these members. Specifically, leg 50 of member 44 is, as may best be appreciated from FIG. 4, shorter than bottom wall 36 of the outer housing member 12, while leg 52 of the intermediate internal member 46 is slightly shorter than leg 50, and finally leg 54 of the remaining internal member 48 is the shortest of all and, in particular, shorter than the next adjacent leg 52. As a consequence of this relationship in size, all the member 44, 46 and 48 readily fit within the confines of the L-shaped construction 34 and 36 of the housing member 12 and these internal members further readily arrange themselves in a tiered fashion, all as is best illustrated in FIG. 4.

Figure 6B:
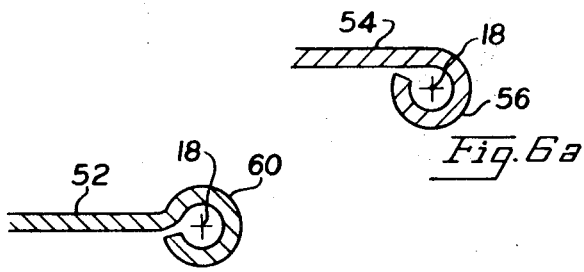
FIGS. 6A, 6B and 6C are partial elevational views, on a greatly enlarged scale, of the connection of each of the internal support members to the common pivot.
Figure 6A:
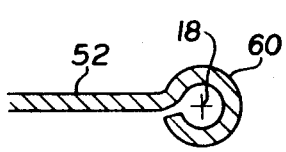
Figure 6C:
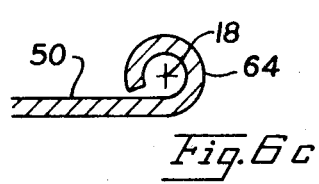

Further, it is within the contemplation of the present invention that the internal members 44, 46 and 48 also be pivotally mounted upon the same pivot axis, namely pivot 18, of the housing member 12. This may be achieved in any one of several ways. The way preferred and illustrated herein, however, is to provide a hooklike configuration 56 which, by its shape, is adapted to engage about a cylindrical pivot rod, such as the pivot 18, in a central location of the depending or free edge of the leg 54. Similar pivot-engaging constructions 58 and 60 are provided on the depending edge of the leg 52 at positions spaced on opposite sides of the central position of hook 56 of leg 54. Pivot-engaging constructions 62 and 64 take up the remaining areas along the common pivot 18 by their locations along the depending edge of leg 50 of remaining internal member 44. As illustrated in FIGS. 6A, 6B and 6C, legs 50 and 52 are readily spaced adjacent each other by orientating leg 54 tangentially to the construction 56 while leg 52 is oriented radially to its pivot-engaging constructions 60 and 58. To accommodate leg 50 in an adjacent position to leg 52 it is merely necessary to arrange the pivot-engaging constructions 62, 64 in a reverse or counterclockwise direction as compared with the tangential construction 56 of leg 54.

The progressively sized L-shaped internal members 44, 46 and 48, all pivotally mounted as just described on a common pivot axis 18, are thus capable of being pivotally moved in the direction of opening movement 22 and when partaking of these pivotal traverses thus successively uncover paraphernalia-mounting surfaces of these members. Specifically, storage surface 72 is rendered accessible upon pivotal opening movement 22 of the housing member 14. Upon pivotal movement of member 48, again in the opening direction of movement 22, the mounting or storage area of storage surface 70 of the intermediate member 48 is rendered accessible. Pivotal movement of member 46 in turn renders accessible storage surface 68 to member 46. Finally, when member 44 is pivoted, access can easily be made to the paraphernalia stored on storage surface 66. A diversity of paraphernalia may be stored on any of the storage surfaces as illustrated by 24, 25, 26, and 28 including self-containing compartments for loose items. To maintain relative spacing between the members 44, 46 and 48 in their pivotal positions, as illustrated in phantom perspective in FIG. 4, use is made of spacing members, individually and collectively designated 74, on each of the free ends of the members. It should be readily appreciated how spacing members 74 cooperate with each other to limit the extent of opening movement of these members relative to each other. Members 74 also function as a convenient grip in lifting the members through pivotal movement. Spacing of the pivoted members 44, 46 and 48 is also controlled by abutment of the legs 50, 52 and 54 of these members against each other following full pivotal traverses of these members to an upright position.

In addition to limits on closing movement 20 of the internal members, container 10 also embodies a construction which limits opposite direction or opening movement 22 of the internal members. Here again this construction may take many forms but in its simplest and preferred form, as illustrated herein, the construction consists simply of an angularly inclined front wall 76 in the construction of the housing member 14. Since wall 76 faces the transversely oriented pivot 18 it, of necessity, occupies a position in the path of pivotal movement of the internal paraphernalia supports or internal members 44, 46 and 48. Further, the inclination of wall 76, of necessity, results in the abutment, as at 78, of the free end of member 48. Additionally, in a properly constructed container 10 there will be abutment of the other members, notably 46 and 44, at elevated points along the inclined wall 76. Alternatively, spacing members 74 can provide the tiered arrangement or spacing between member 46 relative to member 48 and member 44 relative to member 46. An additional advantage of using the inclined wall 76 as a stop or limitation to closing movement 20 of the internal members is that the angle of inclination automatically provides clearance for successive reverse opening movement 22 of the internal members.

For completeness sake, it should be noted that container 10 can advantageously be provided with the following structure which conventionally is found in fishing lure containers. Such structure includes a hand grip 80 on the wall 76 or, as an alternative means of carrying the container 10, a pair of belt-accommodating loops 82 and 84 on the wall 34. Finally, a cooperating detent construction 86 and 88 is provided to hold the two halves 12 and 14 together, at least to an extent which minimizes inadvertent opening, one part of the detent construction being provided on a springy depending projection 90.

From the foregoing description it should be readily appreciated that there has been described herein a container 10 which, although characterized by a relatively simple construction and consisting of a nominal size and also convenient shape to store and carry, is a container that nevertheless has a noteworthy extensive storage capacity, all parts of which are further rendered readily accessible with little effort.

A latitude of modification, change and substitution is intended in the foregoing disclosure and in some instances some features of the invention will be employed without a corresponding use of other features.

We claim:

1. A container for fishing lure and like paraphernalia comprising three upstanding exterior walls arranged so as to bound a generally rectangular internal volume having an open end, means defining a pivot axis located in said open end of said internal volume, the one of said exterior walls in facing relation to said pivot axis being angularly oriented, and plural substantially L-shaped paraphernalia supports formed by an intersecting shorter leg and a longer leg disposed within said internal volume such that corresponding ends of said shorter leg of said supports are pivotally mounted on said pivot axis and said supports are pivotally movable thereabout until the longer ends of said other legs thereof abut against said angularly oriented wall, whereby said abutting supports are supported in spaced relation by said angularly oriented wall to effectively subdivide said internal volume into plural storage compartments.

2. A container as defined in claim 1 wherein said shorter legs of said L-shaped supports are in side by side relationship when said container is in the closed position and also when said container is in the open position.

3. A container as defined in claim 2 wherein each said longer support leg has a spacing member projected from the free end thereof to the side opposite that of said shorter leg, said spacing members cooperating with each other to maintain said spaced relation of said supports in said pivoted positions thereof.

4. A first housing member and a second housing member, said members forming a container for fishing lure and like paraphernalia comprising a pair of opposed exterior housing members cooperating to define an internal storage compartment pivotally mounted to each other for opening and closing movement about a pivot axis oriented transversely of and enclosed within one corner of said storage compartment, and L-shaped internal members, each of said L-shaped internal members having one end of one of the L-shaped members attached directly to and pivotally mounted on said pivot axis, whereby said L-shaped internal members are adapted to be successively pivoted through said opening movement preparatory to successive use of each, and whereby the legs that are directly attached to said pivot are in stacked side-by-side relationship when said container is closed and also when said container is open and all of said L-shaped members have been pivoted.

5. A container as defined in claim 4 wherein said second housing member has an angularly inclined wall in facing relation to said pivot axis effective to serve as a stop limiting closing pivotal movement of said internal members within said storage compartment.

6. A container as defined in claim 5 wherein said internal members have spacing members projected therefrom in said opening direction of movement effective to restrict opening pivotal movements of said members relative to each other to the size of said spacing members.

7. A container as defined in claim 6 wherein said members are L-shaped and have said spacing members projected from the free end of one leg thereof on the side opposite that of the other leg.